United States Patent [19]
Hashida et al.

[11] 3,814,162
[45] June 4, 1974

[54] PNEUMATIC TIRE

[75] Inventors: Taizo Hashida, Nishinomiya; Masaru Okumura; Hiroyasu Fujishima, both of Osaka, all of Japan

[73] Assignee: The Toyo Rubber Industry Co., Ltd., Osaka, Japan

[22] Filed: Oct. 30, 1972

[21] Appl. No.: 301,915

[30] Foreign Application Priority Data
Oct. 28, 1971  Japan.................... 46-86047

[52] U.S. Cl. .......... 152/361 DM, 152/356, 152/374
[51] Int. Cl. ............................................. B60c 9/20
[58] Field of Search .......... 152/354, 355, 356, 360, 152/361 R, 361 DM, 374

[56] References Cited
UNITED STATES PATENTS

| | | | |
|---|---|---|---|
| 2,786,507 | 3/1957 | Howe et al. ................ | 152/361 |
| 3,126,042 | 3/1964 | Cegnar ...................... | 152/361 DM |
| 3,205,931 | 9/1965 | Keefe, Jr. ................... | 152/354 |
| 3,242,965 | 3/1966 | Mirtain ...................... | 152/362 DM |

Primary Examiner—Lloyd L. King
Assistant Examiner—Robert Saifer
Attorney, Agent, or Firm—Sughrue, Rothwell, Mion, Zinn & Macpeak

[57] ABSTRACT

In a semi-radial ply tire having improved high speed durability, wear resistance and cornering properties while retaining good riding comfort, the carcass consists of at least two plies of nylon cords crossing at 70° – 80° with respect to the equatorial line of the tire, and the breaker consists of an inner layer of two plies of steel cords crossing at 15° – 25° with respect to said line and of an outer layer of two plies of textile cords crossing at 10° – 20° with respect to said line, provided that the layer of the steel cords shares 40 – 65 percent of the entire strength of the breaker layer.

6 Claims, 3 Drawing Figures

PATENTED JUN 4 1974  3,814,162

PNEUMATIC TIRE

BACKGROUND OF THE INVENTION

1. Field of the Invention

This invention relates to an improvement in a semi-radial ply tire and more particularly, to providing an improved pneumatic tire in the respect of integrated performances including riding comfort, high speed durability, cornering properties, wear resistance and high load durability, etc.

2. Description of the Prior Art

Generally, pneumatic tires well known at present are roughly divided, from the viewpoint of the construction, into bias types of tires in which carcass plies of cords are disposed obliquely with respect to the radial direction of the tire and radial ply types of tires in which carcass plies of cords are disposed radially or substantially radially of the tire and breaker plies of cords are disposed substantially parallel with respect to the circumferential line of the tire, and moreover, there are proposed various compromise types of tires between both types of tires in which the characteristic constructions of the both are combined.

Radial ply tires have, in general, great advantages over bias ply tires in respect of cornering properties, wear resistance, high speed durability, high load durability, etc., depending upon their constructions of the breaker layer (particularly its material), but they have also drawbacks with regard to riding comfort, transverse rigidity and resistance to cut or break in the sidewall zone.

On the other hand, contrary to the radial ply tires, bias ply tires have drawbacks with regard to wear resistance, cornering properties, high load durability and high speed durability (standing waves occur at an early stage of running), owing to their own constructions. Thus, radial ply tires have numerous advantages in comparison with bias ply tires.

Accordingly, a primary object of this invention is to provide a pneumatic tire having integrated high performances suitable for practical utilization by improving effectively the drawbacks of radial ply tires as afore-mentioned without impairing the advantages, namely by overcoming both the drawbacks of the radial ply tires and of the bias ply tires without impairing both their advantages. That is to say, this invention has a primary object of providing a semi-radial ply tire having good riding comfort, high speed durability, cornering properties and wear resistance.

The other object of the invention will be apparent from the contents of the specification hereinafter disclosed.

SUMMARY OF THE INVENTION

The essential feature of this invention, for accomplishing the above objects, resides in a pneumatic tire having a pair of bead wires, a tread, a carcass layer fixed to the bead wires, and a breaker layer located between the tread and carcass layer, notably in its construction of the carcass and breaker layers in which said carcass layer consists of at least two plies of nylon cords which are disposed so as to cross mutually at an angle of inclination, with respect to the equatorial line of the tire, of from 70° to 80° and said breaker layer consists of two superposed groups: a layer of two plies of steel cords which are disposed so as to cross with each other at an angle of inclination, with respect to the equatorial line of the tire, of from 15° to 25° and a layer of two plies of textile fiber cords which are disposed outside (to the radial direction) the said steel cords so as to cross with each other at an angle of inclination, with said line, in a range of from 10° to 20° and said layer of steel cords shares 40 to 65 percent of the entire strength of said breaker layer.

Certain preferred embodiments of the invention will be described in conjunction with the accompanying drawings.

DESCRIPTION OF PREFERRED EMBODIMENTS

Figure 1:
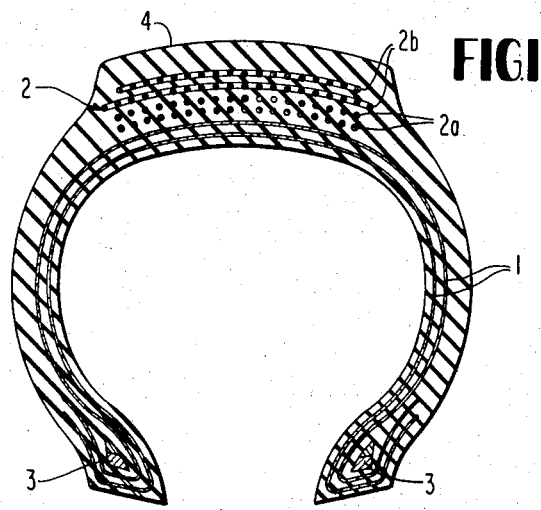
FIG. 1 is a partial, sectional view in radial direction of one embodiment of a semi-radial ply tire constructed in accordance with the invention.
Figure 2:
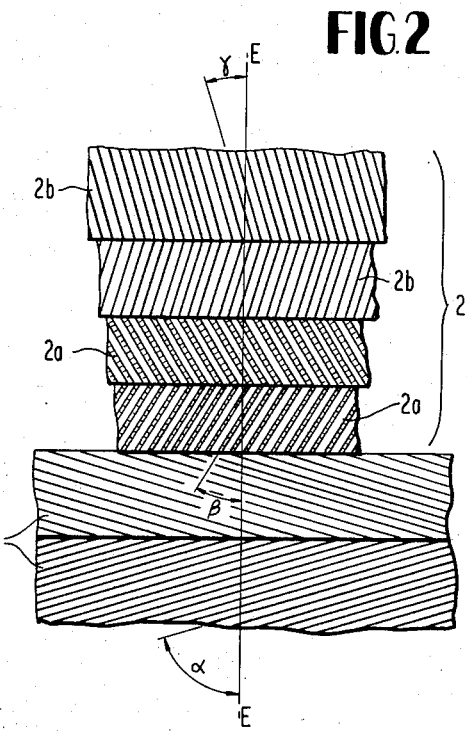
FIG. 2 is a schematic view showing the manner of arrangement and orientation of the plies in the carcass and breaker layers of the tire in FIG. 1.

Referring to FIG. 1, a semi-radial ply tire constructed in accordance with the invention is illustrated, which comprises a carcass layer 1 of nylon cords (two plies in this example), a breaker layer 2 consisting of steel cords 2a (two plies are employed) and of textile fiber cords 2b (two plies are employed), a pair of bead wires 3 and a tread 4. The breaker layer 2 and the carcass layer 1 in this embodiment are constructed in such a manner of orientation and arrangement as shown in FIG. 2. That is to say, in the carcass layer 1, the angle $\alpha$ of inclination of the plies of nylon cords with respect to the equatorial line E — E of the tire is within a range of 70° to 80° and each of the plies is disposed mutually alternately in opposite direction. On the other hand, in the breaker layer 2, the angle $\beta$ of inclination of the plies of the inner steel cords 2a with respect to the equatorial line E — E of the tire is in a range of 15° to 25° and each of the plies is disposed so as to cross with each other in alternately opposite direction, whereas the angle $\gamma$ of inclination of the plies of the outer textile fiber cords 2b with respect to the equatorial line E — E of the tire is in a range of 10° to 20° and each of the plies is disposed so as to cross with each other in alternately opposite directions.

The reason why the nylon cord material is used as the carcass plies each crossing at an angle of 70° to 80° with respect to the equatorial line of the tire is because rayon or polyester cord material would be defective in high load durability.

The construction of the breaker layer that the two plies of the steel cords are disposed at an angle of inclination, with respect to the equatorial line of the tire, of 15° to 25° and two plies of the textile fiber cords are disposed outside the steel cords at an angle of inclination, with respect to said line, of 10° to 20° is most advantageous in enhancing riding comfort, cornering properties and wear resistance. If both the said angles of inclination are less than the ranges specified above, riding comfort of the tire will be lessened remarkably, while if both said angles of inclination are greater than the ranges specified above, cornering power and wear resistance will be lessened. By the combination of the steel cords and textile fiber cords made in the specified manner of construction, it is possible to obtain a semi-radial ply tire having better performances than the total ones of both at a relatively low cost, namely a semi-radial ply tire in which good wear resistance and cornering properties characteristic of steel cords as a breaker layer is retained without deteriorating riding comfort and high speed durability which is a defect where steel cords form a breaker layer.

It is preferred that since the steel cords and the textile fiber cords to be employed as the breaker layer differ greatly in modulus of elasticity, the respective rubber compounds for embedding both have also different moduli. Therefore, it is desirable that the rubber compound for embedding the steel cords has a 100 percent modulus of 50 to 70 Kg/cm$^2$ and the rubber compound for embedding the textile fiber cords has a 100 percent modulus of 30 to 50 Kg/cm$^2$. The constitution of the rubber compounds as such may contribute to further enhancement of good wear resistance and cornering power, which characteristics are ascribable to the steel cords, and also greatly to further improvement in the effects, e.g., moderation of shock imparted from the road or ground, enhancement of riding comfort, decrease in occurence of tread separation, etc., which characteristics are ascribable to the textile fiber cords.

It is noticeable and essential in this invention the variation in strength shared proportion of the steel cords and textile fiber cords in the breaker layer exerts a great influence upon the performances of the tire described above. Suitable strength shared proportion of the cords for the tires desired may be altered and adopted properly depending upon density, structure and class of the cords.

By way of example, semi-radial ply tires for tests constructed in the varying proportions were determined and compared with regard to various performances.

Table 1 given below shows values of strength shared proportion of the breaker cords in the test tires. In that example, as a textile fiber cord material, rayon cord is used, but various other synthetic fiber cords including polyester cords, polyvinyl alcohol cords and the like may also be used.

TABLE 1

|  | Strength Shared Proportion (%) | | | | | |
|---|---|---|---|---|---|---|
|  | Test Tire | | | | | |
|  | A | B | C | D | E | F |
| Rayon Cords | 100 | 65 | 50 | 40 | 25 | 0 |
| Steel Cords | 0 | 35 | 50 | 60 | 75 | 100 |

Remarks:
1. In the table above, the strength of each ply of the cords was measured in a direction of the cords.
2. Tire A has a breaker layer consisting only of four plies of rayon cords (1650 d/3).
3. Tires B, C, D and E each have a breaker layer consisting of two plies of rayon cords and two plies of steel cords.
4. Tire F has a breaker layer consisting only of four plies of steel cords (3×3×0.15).
5. Each of the test tires was constructed in a size of 175 SR 14.

Each of the test tires was put to a service run test on a street road (under relatively good conditions), being mounted on a car. The test results obtained on various performances are shown below in turn for comparisons.

First, Table 2 below indicates the comparative date on index of wear resistance, which index is compared and calculated in terms of the wear resistance of Tire A which is set as 100.

TABLE 2

| Test Tire | A | B | C | D | E | F |
|---|---|---|---|---|---|---|
| Index of wear resistance | 100 | 105 −120 (115) | 130 −170 (152) | 150 −190 (172) | 160 −200 (178) | 170 −205 (188) |

Remarks: The values in the parentheses are average values obtained.

As will be apparent from the results contained in the above table, when the strength shared proportions of the rayon cords and of the steel cords in the breaker layer are 40 percent and 60 percent, respectively, which percentages are in the specified ranges of the invention, the tire thus constructed (exemplified by Tire D) has an improved wear resistance by about 72 percent as compared with that of the tire constructed solely of rayon cords in the breaker layer (exemplified by Tire A).

Thus, it will be seen that even though the steel cords are partly replaced with the textile fiber cords, the tire thus obtained results in only a slight reduction of wear resistance. This is believed to be ascribed largely to the non-compressive effect of the steel cords.

In the following place, the comparative test results on cornering properties of the test tires are shown in Table 3 below. In that case, the cornering properties are represented by the cornering power index. The cornering power index is evaluated in terms of the cornering power (magnitude) of Tire A set as 100.

TABLE 3

| Test Tire | A | B | C | D | E | F |
|---|---|---|---|---|---|---|
| Cornering power index | 100 | 110 | 130 | 140 | 145 | 150 |

As is observed from Table 3, the results of the cornering power also show similar tendency to those of the wear resistance shown in Table 2. That is, Tires C, D and E exhibit respective cornering powers close to the cornering power of Tire F whose breaker layer consists only of the steel cords, so that it is apparent that they have the effect of steel cords more greatly. The improvement in cornering properties is an important factor that relates to stability of a car against straight running and cornering at a high speed.

Finally, the riding comfort indices of the test tires obtained are shown in Table 4 given below. The riding comfort value is generally evaluated as that at time of running over a projecting object, and the riding comfort index is represented on the basis of the riding comfort value of Tire A set as 100.

TABLE 4

| Test Tire | A | B | C | D | E | F |
|---|---|---|---|---|---|---|
| Riding Comfort Index | 100 | 99 | 98 | 96 | 90 | 86 |

The data of indices given in Table 4 suggest that the riding comfort of Tire F whose breaker layer consists only of the steel cords is inferior to that of Tire A whose breaker layer consists only of the rayon cords. This is because the riding comfort is determined practically by an ability of the tire to envelope the projecting object when the tire runs over it (enveloping effect), namely by rigidity of the belts in the breaker layer. Thus, riding comfort is influenced largely by strength shared proportions of the steel cords and textile fiber cords. Furthermore, it has been found, as a result of service tests that better riding comfort may be obtained with a case where the angle of inclination, with respect to the equatorial line of the tire, of the steel cords is larger than that of the textile fiber cords by at least 5°.

The results of the various tire tests given above evidently teach that when a specific combination of the steel cords and textile fiber cords in the breaker layer is chosen and both the cords are arranged at mutually different, specified angles of inclination in relation to the equatorial line of the tire, wear resistance and cornering properties may be improved without substantially impairing riding comfort.

Figure 3:
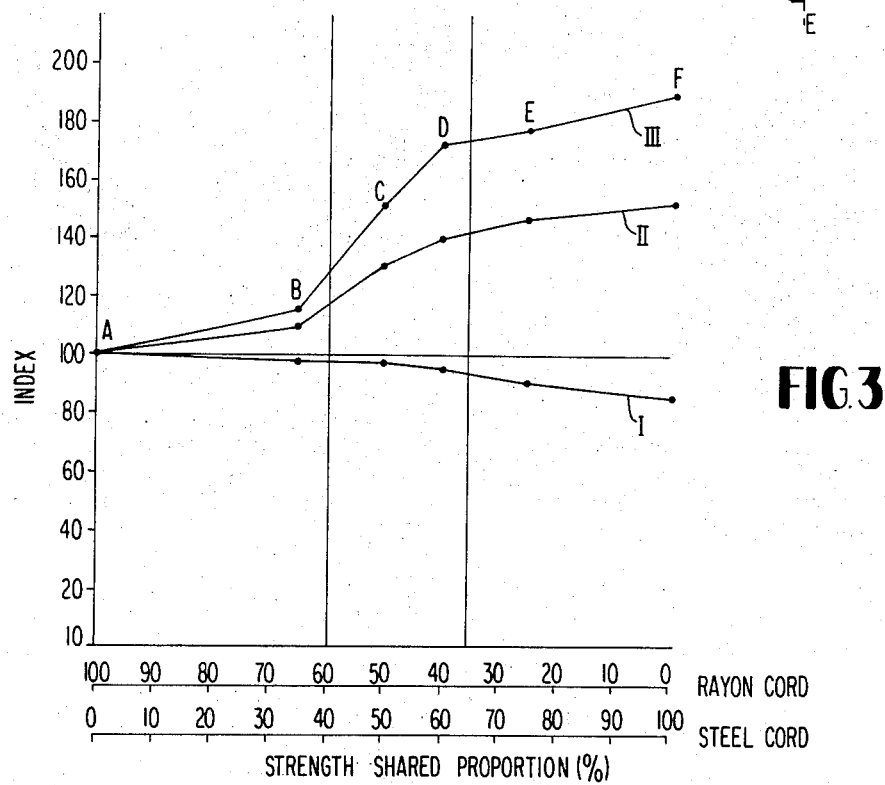
FIG. 3 is a diagrammatical view of characteristic curves showing the variations of the characteristics of the semi-radial ply tire in accordance with the embodiment of the invention shown in FIG. 1.

The above test results are summarized and illustrated by the characteristic curves in FIG. 3. The characteristic curves show that a preferred range of the strength shared proportion of the steel cords to the textile cords, in which range the cornering properties and wear resistance of the tire may be remarkably enhanced without reducing the riding comfort very much, is in a range of 40 to 65 percent. In FIG. 3, the abscissa represents the strength shared proportion of the rayon cords and steel cords constituting the breaker layer of the respective test tire, whereas, the ordinate represents the respective indices of properties of the test tire, with the curve I showing a variation in riding comfort indices of the test tires (Table 4), the curve II showing a variation in cornering power indices of the test tires (Table 3) and the curve III showing a variation in wear resistance indices of the test tires (Table 2).

It is to be understood, however, that the above description discloses only preferred embodiments of the invention and that various other modifications may be made without departing from the scope and spirit of the invention.

What is claimed is:

1. In a pneumatic tire comprising; a tread, a pair of bead wires, a carcass layer fixed to the bead wires and a breaker layer located between the tread and carcass layer, the improvement wherein: said carcass layer consists of at least two plies of nylon cords which are disposed so as to cross mutually in opposite directions at an angle of inclination, with respect to the equatorial line of the tire, of from 70° to 80° and said breaker layer consists of two superposed groups: one group being an inner layer of two plies of steel cords embedded in a rubber compound and the other group being an outer layer of two plies of textile fiber cords embedded in a rubber compound, said one group having said plies of steel cords crossing each other in opposite directions at an angle of inclination, with respect to the said line, of from 15° to 25° and sharing 40 to 65 percent of the over-all strength of the breaker layer and said other group having said plies of textile fiber cords crossing each other in opposite directions at an angle of inclination, with respect to said line, of from 10° to 20°, and wherein the angle of inclination with respect to the equatorial line of the tire, of said steel cords is at least 5° larger than that of said textile fiber cords.

2. In a pneumatic tire comprising: a tread, a pair of bead wires, a carcass layer located between the tread and carcass layer, the improvement wherein: said carcass layer consists of at least two plies of nylon cords which are disposed so as to cross mutually in opposite directions at an angle of inclination, with respect to the equatorial line of the tire, of from 70° to 80° and said breaker layer consists of two superposed groups: one group being an inner layer of two plies of steel cords embedded in a rubber compound and the other group being an outer layer of two plies of textile fiber cords embedded in a rubber compound, said one group having said plies of steel cords crossing each other in opposite directions at an angle of inclination, with respect to the said line, of from 15° to 25° and sharing 40 to 65 percent of the over-all strength of the breaker layer and said other group having said plies of textile fiber cords crossing each other in opposite directions at an angle of inclination, with respect to said line, of from 10° to 20°, and wherein said rubber compound for embedding the steel cords has a 100 percent modulus of 50 to 70 $Kg/cm^2$ and said rubber compound for embedding the textile fiber cords has a 100 percent modulus of 30 to 50 $Kg/cm^2$.

3. The pneumatic tire as set forth in claim 1, wherein said textile fiber cords are of rayon.

4. The pneumatic tire as set forth in claim 1, wherein said textile fiber cords one material of the group consisting of polyester and polyvinyl alcohol.

5. The pneumatic tire as set forth in claim 1, wherein said carcass layer consists of two plies of nylon cords.

6. The pneumatic tire as set forth in claim 1, wherein the respective plies of cords in said carcass layer and in said breaker layer are oriented at equal and opposite angles of inclination with respect to the equatorial line of the tire and thus, all the plies are in sequence, oriented in alternate directions.

* * * * *